July 24, 1928.
R. SCHOELL
1,678,486
TRANSMISSION
Filed July 5, 1927
4 Sheets-Sheet 1
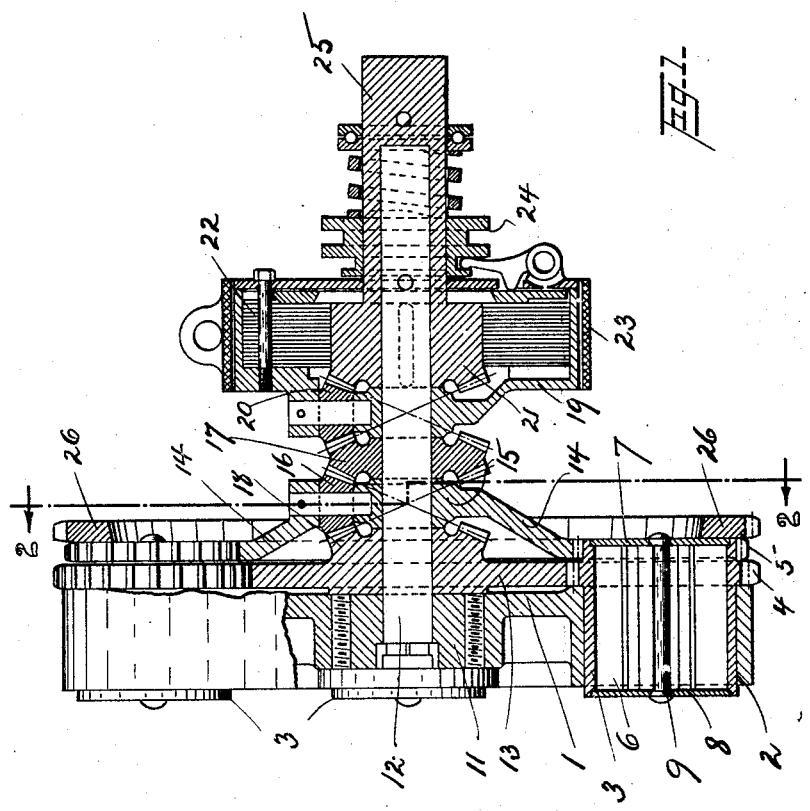
INVENTOR.
Reinhold Schoell
BY
his ATTORNEY.

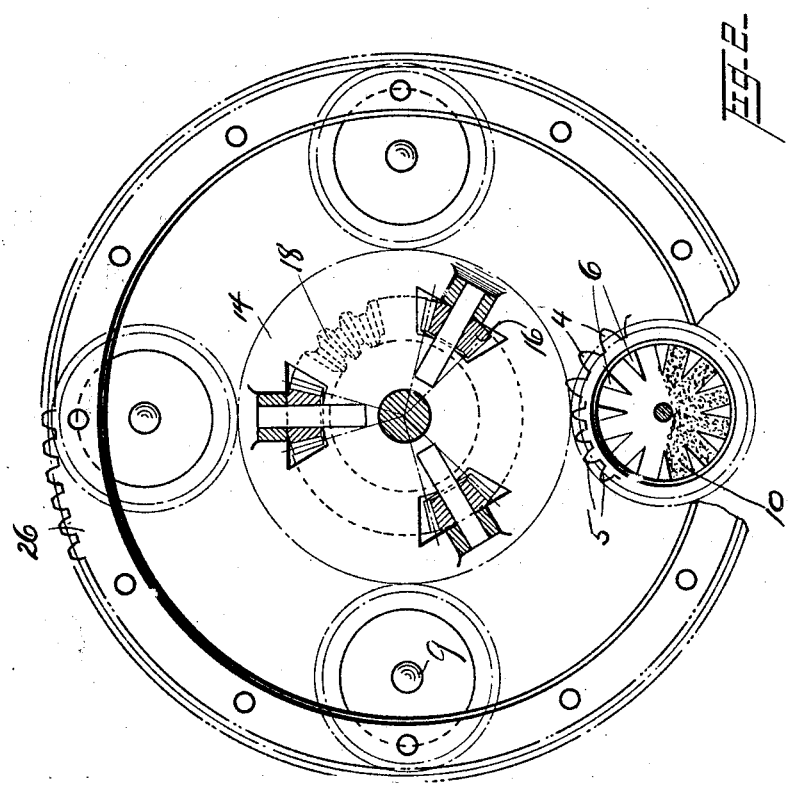

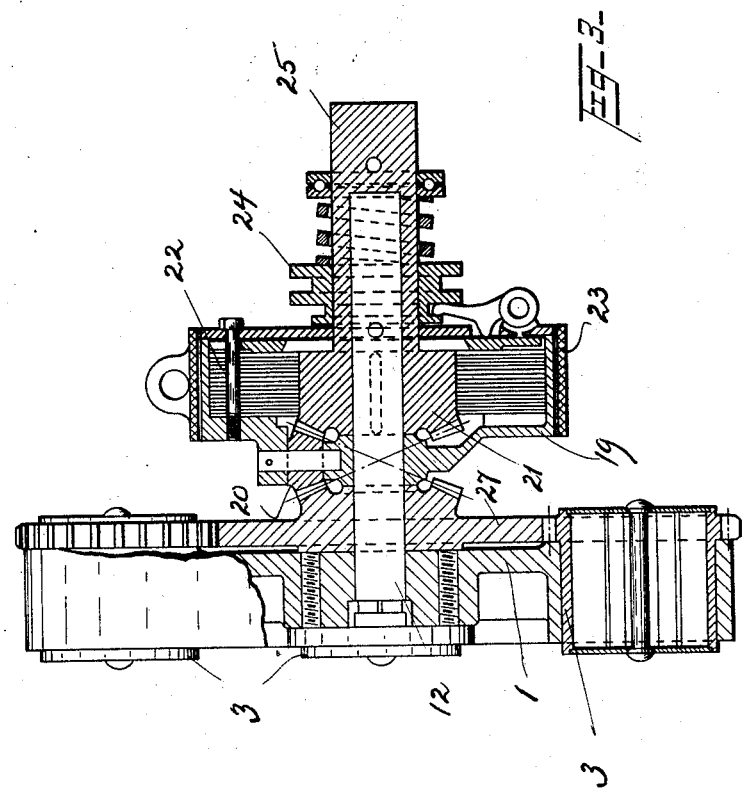

July 24, 1928.  1,678,486
R. SCHOELL
TRANSMISSION
Filed July 5, 1927  4 Sheets-Sheet 4
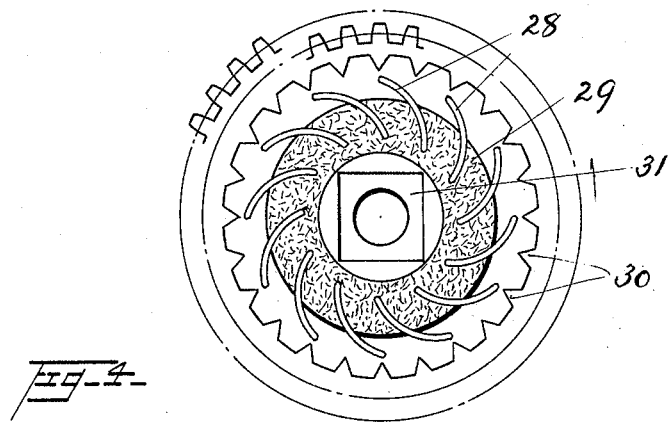
Fig-4-
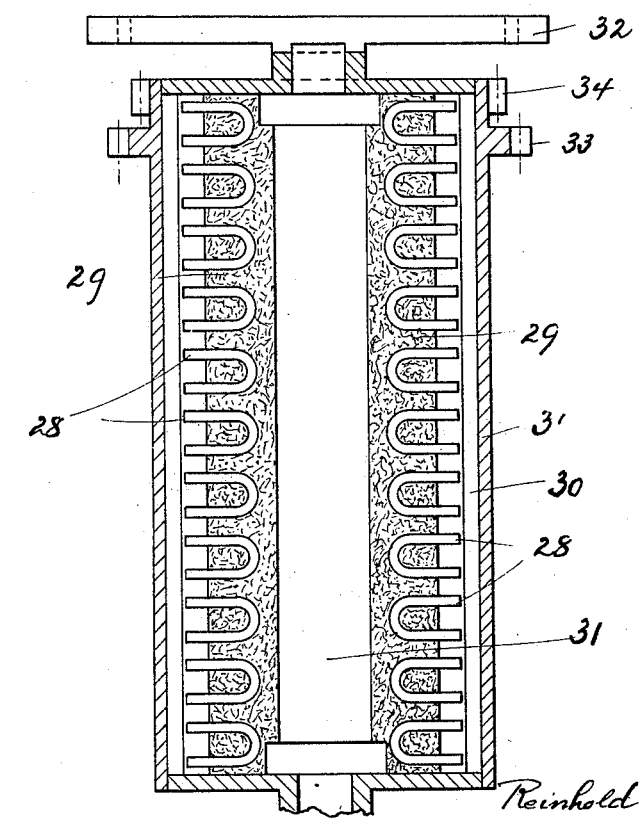
Fig-5-
INVENTOR.
Reinhold Schoell
BY
his ATTORNEY.

Patented July 24, 1928.

1,678,486

UNITED STATES PATENT OFFICE.

REINHOLD SCHOELL, OF KELSEY CITY, FLORIDA.

TRANSMISSION.

Application filed July 5, 1927. Serial No. 203,534.

My invention relates to transmissions and has for its object to produce a novel transmission gear, more especially adapted for automobiles and other motor-driven vehicles, which is at once simple in construction and operation and allows a gradual change in speed without the use of any gear shifts, or any parts changing their relative positions.

The particular object of the present invention is to provide improved means for driving at variable gear ratios and to insure a positive low speed with immediate delivery of motion and an easy progression from low to high without undue motor acceleration. The low speed is obtained through a well-known planetary gearing. Two gears of unequal size are in mesh with two other corresponding gears, which are rotatably mounted on the central shaft. The former two gears are formed on the ends of cylinders mounted in the fly-wheel and designed to furnish a varying resistance. These cylinders with the gears formed thereon are filled to nearly one-half of their cubic contents with a liquid or other substance, preferably a fine metal powder, and carry the speed from intermediate to high at a gradually increasing gear ratio finally locking the parts together at high speed. Another set of cylinders also formed with gears thereon to mesh with the gears rotatably mounted on the central shaft may be provided, which cylinders contain permanent magnets which are held by a non-magnetic substance so as to move in said cylinders relative to projections inwardly extending from the inner wall of the cylinders, to exert thereon, as the cylinders revolve, a magnetic force thereby resisting the movement of said cylinders. This resistance is a constant resistance as distinguished from the resistance offered by the weighted cylinders, which constitute a very rapidly increasing resistance. The constant resistance exerted by the magnets acts as a sort of intermediate speed and makes it unnecessary to unduly accelerate the motor when travelling under a load and at times where slow speed is required and the driver has to have perfect control over the car.

Where both the weighted cylinders and cylinders containing the magnets are used together, about half the number of cylinders will be equipped with magnets whereas the other half will be weighted cylinders. But, of course, the transmission can be operated with either cylinders alone, but I have found that the two kinds of cylinders used together will result in a more even driving than when used separately.

In the annexed drawing on which I have illustrated my invention, by way of example, Fig. 1 is a central longitudinal sectional view of my transmission including a differential gear; Fig. 2 is a section along line 2—2 in Fig. 1 as viewed in the direction of the arrows in said figure; Fig. 3 is a similar view as Fig. 1 showing the transmission as including a single driving element only; Fig. 4 is a central longitudinal section through a cylinder containing permanent magnets and Fig. 5 is an end view of the same.

1 indicates a deep fly-wheel which is mounted directly on the crank-shaft of the engine and is provided near its periphery with circular openings 2, in which openings are rotatably journalled hollow cylindrical bodies 3 with one end projecting beyond the openings and being formed at this end with two sets of toothed gears 4 and 5 of different diameter. On their inside, the cylindrical bodies are formed with shelf-like projections 6, and they are closed at both ends by endplates 7 and 8, which are held in position by a central bolt 9 extending through the cylindrical body. These cylindrical bodies may contain a liquid, e. g. oil, but preferably, I fill these cylindrical bodies, to about one-half of their cubic contents, with a fine metal-powder, which, upon the fly-wheel 1 being set in motion is thrown by the centrifugal force against the inner wall of the cylindrical body nearest the outer periphery of the fly-wheel, as shown in Fig. 2, wherein one of the cylindrical bodies (at the bottom in said figure) the metal is indicated at 10.

Loosely mounted in the hub 11 of the fly-wheel 1 is one end of a shaft 12 on which is rotatably mounted a combined spur- and bevel-gear 13. The spur-teeth of this gear are in mesh with the teeth of the larger gears 4 formed on the cylindrical bodies 3. Also rotatably mounted on shaft 12, next to the gear 13, is a spur-gear 14, the teeth of which gear are in mesh with the teeth of the smaller gears 5 formed on the cylindrical bodies 3. The hub 15 of this latter spur-gear has three openings, 120° apart from each other, in which openings are rotatably located toothed bevel gears 16, which are in mesh with the combined spur and bevel gear 13 and a double toothed bevel gear 17 mounted on shaft 12 and being of the same size and provided with the same number of teeth as the bevel-gear portion 18 formed on the spur-gear 13. The latter, together with the parts 14 and 17 constitutes a differential gear. At 19 is shown a brake-drum. In the hub of said drum are provided three openings, 120° apart from each other, in which openings are rotatably located toothed bevel gears 20, like the toothed bevel gears 16 located in the hub 15 of the spur-gear 14, which bevel-gears 20 are likewise in mesh with the double bevel gear 17, as is clearly shown in Fig. 1.

At 21 is shown mounted on shaft 12 a bevel-gear carrying on its hub a plurality of disks 22 forming a disk clutch. This bevel-gear 21, together with the brake-drum 19 and the double bevel-gear 17, constitutes a second differential unit. At 23 is indicated a brake-band surrounding the drum 19 and adapted to be actuated in a well-known manner by the operator, by means of a pedal. At 24 is indicated a grooved collar slidably mounted on the tubular end portion 25 of bevel-gear 21 keyed to shaft 12.

At 26 is shown a large annular toothed gear fastened to the periphery of the flywheel 1 both for holding the cylindrical bodies 3 in position and to be engaged with the self-starter.

The operation is as follows:

When the fly-wheel 1 is set in motion by the engine, the gear wheels 4 and 5 formed on the projecting ends of the hollow cylinders 3 will rotate the gear wheels 13 and 14 whereby the double bevel gear 17 will be rotated in the same direction as the fly-wheel 1, with the result of a positive and highly desirable low speed. The double bevel gear 17 being set in rotation, the parts 19 and 21 will also be rotated, provided the disk clutch 22 is engaged and thus, the car will start ahead with a speed at the rate of about ten revolutions of the engine to one of the drive shaft. When disk clutch 22 is disengaged and, by means of the pedal above referred to, the brake-band 23 is tightened around the drum 19 preventing the same and the second differential gear from rotating, a reverse motion will be imparted to the car through the bevel gears 16 and 20 at the same ratio as the forward speed.

When the car has started its forward movement and the engine speed is increased, the powdered metal in the cylinders 3 being thrown outward by centrifugal force will tend to hold the cylinders 3 in fixed position resulting in both gears 13 and 14 being rotated forward, and as the fixedness of the cylinders 3 increases with the higher engine speed, the ratio will change to a higher speed, until finally all the parts are locked together and will rotate as a single unit at high speed.

A similar arrangement as illustrated in Fig. 1 is shown in Fig. 3, except that in this case, only a single driving element is provided comprising the combined spur- and bevel-gear 27, the spur-teeth of which mesh with the spur-gears formed at the ends of the cylinders 3 provided in the fly-wheel 1. The bevel teeth of the combined spur- and bevel gear 27 mesh direct with the bevel gears 20 rotatably mounted in the hub of the brake drum 19 which bevel gears, in the same way as shown in Fig. 1, are also in mesh with a bevel gear 21 mounted on shaft 12 and carrying on its hub the disk-clutch 22. In Fig. 3 is also shown the brake-band 23 encircling the drum 19 and adapted to be tightened by means of a pedal (not shown) by the operator. Also the grooved collar 24 is shown and the tubular end portion 25 of the bevel-gear 21.

In addition to the cylinders 3 mounted in the fly-wheel 1 (Figs. 1 and 3) there may be provided in said fly-wheel also cylinders 3' such as shown in Figs. 4 and 5. These cylinders contain a plurality of permanent magnets 28 which are shown embedded in a non-magnetic mass indicated at 29 and are held thereby in a position relative to projections 30 inwardly extending from the inner walls of the cylinders. Through these cylinders extends a square shaft 31 carrying on the outside of the cylinder a yoke 32 for connecting the shaft and the magnet to the fly-wheel so that the magnets will revolve within their cylinders relative to the inwardly extending projections 30 exerting thereon a magnetic force resulting in a resistance to the cylinders. This resistance, as will be understood, is a constant resistance as distinguished from the varying resistance of the weighted cylinders 3. The cylinders 3' like the cylinder 3, are formed at their projecting ends with toothed gears 33 and 34 of different diameter to mesh with the corresponding toothed gears 13 and 14 respectively shown in Fig. 1.

As will appear from the foregoing, as the engine starts, first the low speed will act and then, as the speed increases, the constant resistance furnished by the permanent magnets will gradually retard the revolutions of the cylinders 3', which resistance will carry the car at a lower gear ratio without undue acceleration of the engine to high speed. The resistance furnished by the weighted cylinders 3 will support the resistance of the magnet cylinders 3' to carry the car to high speed, when all the parts will be locked together to revolve as a unit.

As the cylinders revolve, the weight therein will have to be constantly lifted, this lifting of the weight supplying the resistance which gradually slows up the cylinders and throws with increased directnesss the engine power into the central gears constantly reducing the gear ratios to the final direct drive.

While I have illustrated and described an embodiment of my invention, the latter is, of course, not limited to this particular disclosure, and I claim as my invention:

1. The combination with a shaft, of a fly-wheel rotatable about the axis of said shaft and having a plurality of circular openings near its periphery, closed hollow cylindrical bodies rotatably journalled in said circular openings and containing a substance of high specific gravity, toothed gears of different diameters formed on the outwardly projecting ends of said cylindrical bodies, two toothed gears rotatably mounted on said shaft and in mesh with said other toothed gears, one of said two toothed gears having a toothed bevel gear formed thereon, a double toothed bevel gear, pinion members in engagement with said double toothed bevel gear and said toothed bevel gear, and a means actuated by said double toothed bevel gear for transmitting the rotation of said fly-wheel to said shaft at variable speeds, the said two toothed gears and double toothed bevel gear constituting a differential gear.

2. The combination with a shaft, of a fly-wheel rotatable about the axis of said shaft and having a plurality of circular openings near its periphery, closed hollow cylindrical bodies rotatably journalled in said circular openings and containing a substance of high specific gravity and being formed at their outwardly projecting ends with toothed gears of different diameters, two toothed gears rotatably mounted on said shaft and in mesh with said other toothed gears, one of said two toothed gears having a toothed bevel gear formed thereon and the other of said two toothed gears carrying in its hub rotatable bevel gears in mesh with said toothed bevel gear, a double toothed bevel gear rotatably mounted on said shaft in mesh with said rotatable bevel gears, said double bevel gear and said two toothed gears constituting a differential gear, a drum rotatably mounted on said shaft and carrying rotatable bevel gears in mesh with said double bevel gear, another bevel gear keyed to said shaft and in mesh with said rotatable bevel gears carried by said drum, said last mentioned bevel gear together with said last mentioned rotatable bevel gears and said double bevel gear constituting a second differential gear, a clutch for coupling said last mentioned bevel gear to said drum, and a means for operating said clutch.

3. The combination as specified in claim 2, including a brake band encircling said drum and adapted to be operated to prevent rotation of said drum.

4. The combination with a central shaft, of a fly-wheel rotatable about the axis of said shaft and having circular openings near its periphery, a set of closed hollow cylindrical bodies rotatably journalled in certain of said circular openings and containing a substance of high specific gravity and a second set of hollow cylindrical bodies positioned in others of said circular openings and provided with inwardly projecting portions, permanent magnets in said last-mentioned cylindrical bodies and adapted to revolve therein relative to said projecting portions, toothed gears of different diameters formed on the outwardly projecting ends of said cylindrical bodies, two toothed gears of different diameters rotatably mounted on said central shaft and in mesh with said other toothed gears, and a means for transmitting the rotary movement of said fly-wheel through said toothed gears to said shaft at variable speeds.

5. The combination with a central shaft, of a fly-wheel rotatable about the axis of said shaft and having circular openings near its periphery, closed hollow cylindrical bodies rotatably journalled in said circular openings and containing a substance of high specific gravity, toothed gears of different diameters formed on the projecting ends of said cylindrical bodies, two toothed gears of different diameters rotatably mounted on said central shaft and in mesh with said other toothed gears, means operatively connected with one of said first named toothed gears for transmitting the rotary movement of said fly-wheel through said toothed gears to said shaft at variable speeds, and means for retaining said cylindrical bodies in the circular openings of said fly-wheel, said last named means being arranged to be connected to the self-starter of an engine.

In testimony whereof I affix my signature.

REINHOLD SCHOELL.